Patented June 26, 1934

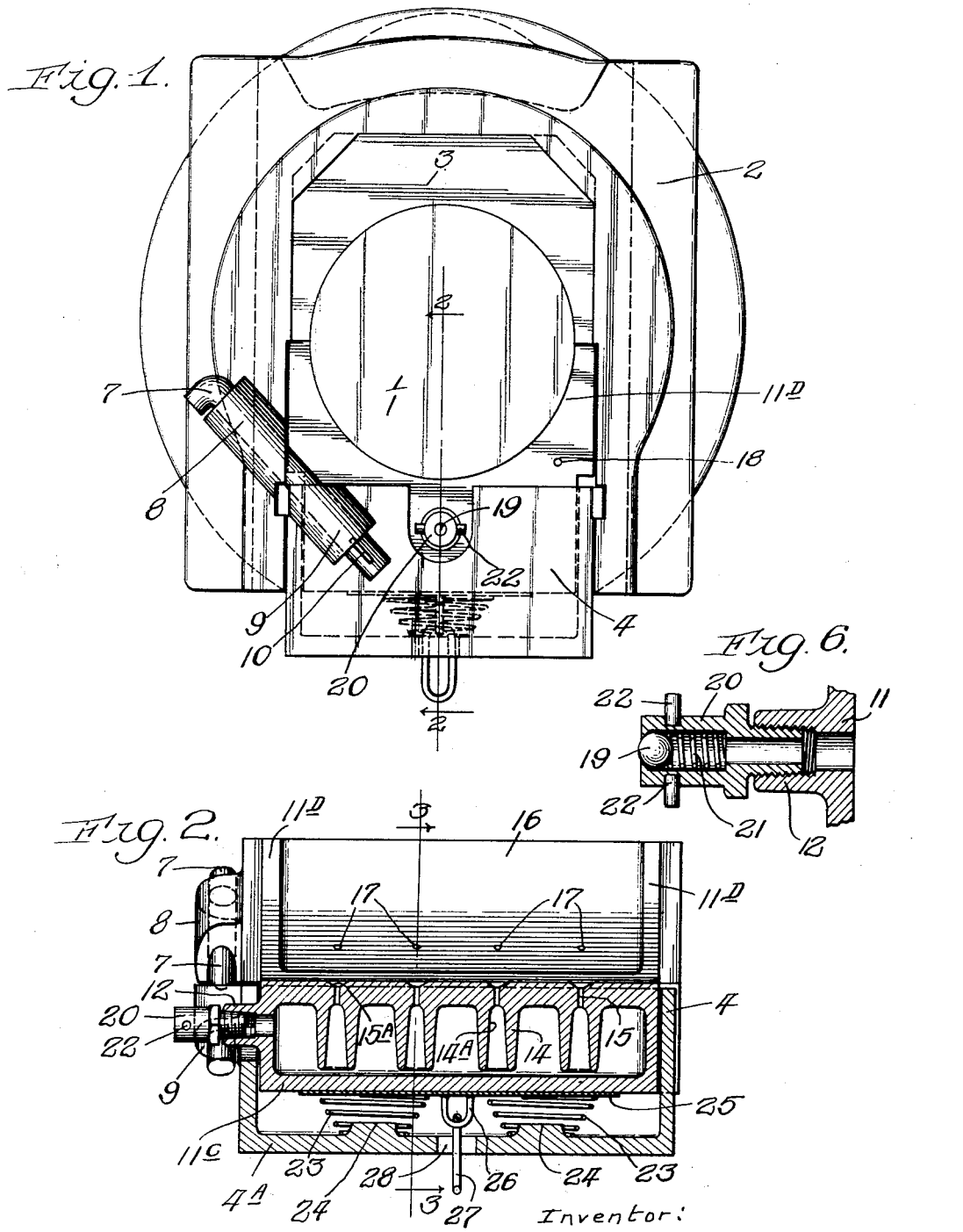

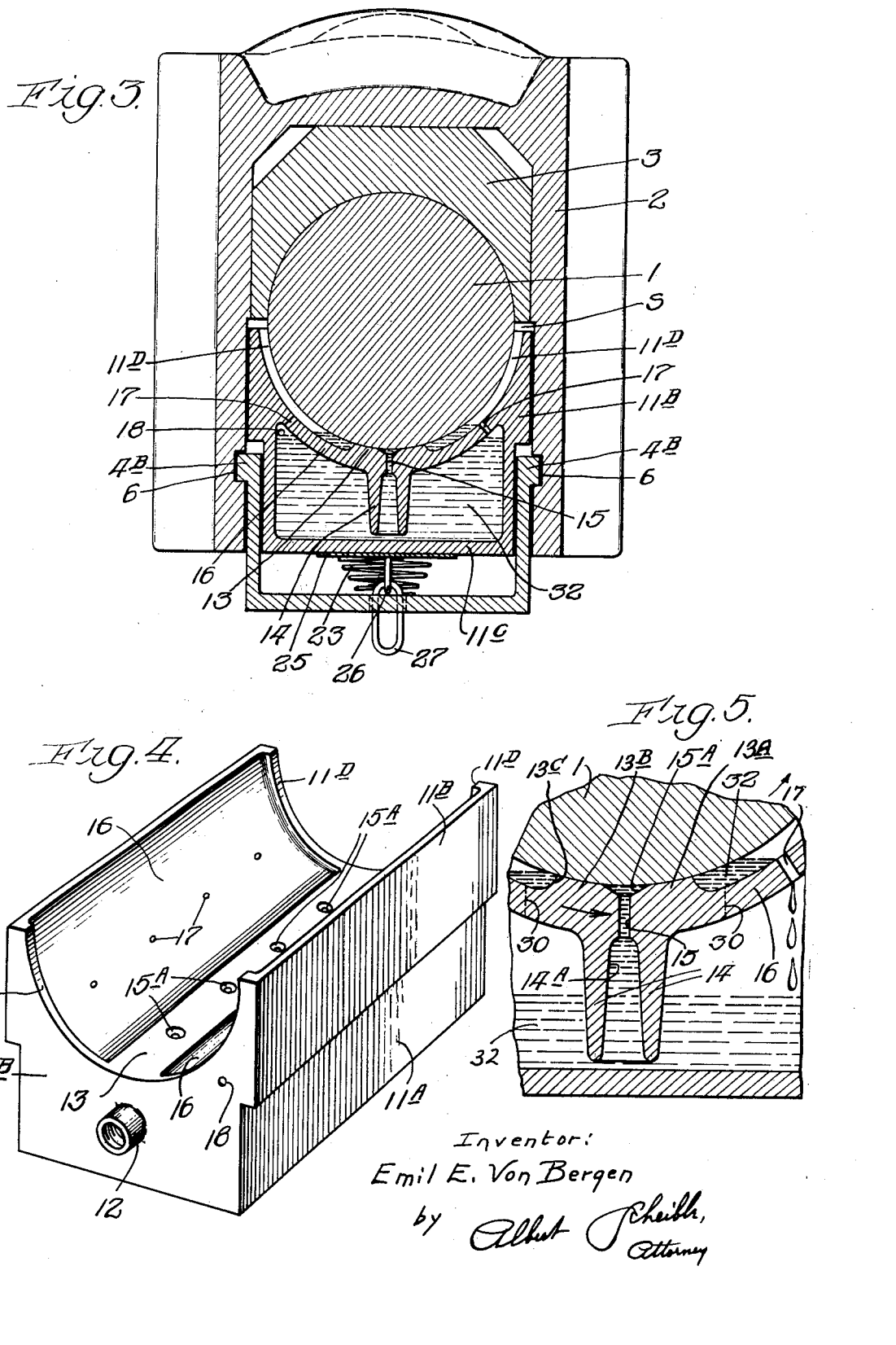

1,964,547

UNITED STATES PATENT OFFICE 1,964,547

LUBRICATOR FOR AXLE OR SHAFT BEARINGS

Emil E. Von Bergen, Chicago, Ill.

Application November 9, 1931, Serial No. 573,789

6 Claims. (Cl. 308—88)

My invention relates to means for lubricating axles, shafts or other rotating members at their bearings.

Generally speaking, the objects of my invention are the providing of simple and effective means for continuously feeding lubricant to, and distributing lubricant over, the portion of an axle or the like which is journaled in the bearing; automatically returning any excess of lubricant to the reservoir for the lubricant; also excluding dirt and moisture from the adjacent portion of the axle; and facilitating the replenishing of the supply of lubricant in the reservoir.

More particularly, my invention aims to provide a lubricator for this purpose which will cause the feeding of the lubricant to be effected conjointly by the rotation of the axle and by the atmospheric air pressure, without requiring either wicks, waste or plungers for feeding the lubricant. Furthermore, my invention aims to provide a lubricator of this class which will permit the supply of lubricant to be replenished speedily from the exterior of the lubricator.

In one of its immediate commercial aspects, the lubricator of my invention is particularly adapted for lubricating the axle bearings on locomotives and railway cars. In this aspect, my invention aims to provide a lubricator which can speedily be substituted, without any change of other parts, for the waste-filled cellars, the cellar and spring-pressed follower assemblies, or other lubricating provisions now commonly used on railway cars and locomotives; which will require much less attention than the provisions now in general use, and which will also act as a shock absorber to reduce the damaging of the lubricator.

Still further and also more detailed objects will appear from the following specification and from the accompanying drawings, in which Fig. 1 is an end view of a lubricator embodying my invention, showing this as attached to an axle bearing for a locomotive.

Fig. 2 is a central vertical section, taken longitudinally of the bearing (namely, along the line 2—2 of Fig. 1) through the lubricant-container and the lubricator-supporting means shown in Fig. 1, with the axle omitted.

Fig. 3 is a transverse section through the bearing, shaft and lubricator assembly of Fig. 1, taken along the line 3—3 of Fig. 2.

Fig. 4 is a perspective view of the lubricant container alone.

Fig. 5 is an enlargement of a portion of Fig. 3.

Fig. 6 is a cross section of the lubricant nipple and valve.

In the drawings, I am showing my invention as used in connection with the portion of a horizontal wheel axle 1 which is disposed within a conventional bearing box 2 (of inverted U-shape), and with a bearing 3 interposed between the upper half of the axle and the top (or U-back) of the bearing box. With such journals for wheel axles, it has been customary on most locomotives to lubricate the axle by supporting lubricant-saturated waste in a socalled cellar below the axle portion which underhangs the bearing, and to depend on both the capillarity of the waste and the compression of this waste for continuously supplying lubricant to the axle. In practice, the saturated waste will not continuously remain in contact with the axle, thereby requiring an undesirable amount of attention to keep the waste in contact with the axle and to replenish lubricant; and the admission of dust to the cellar soon retards both the absorption of the lubricant by the waste from the lower part of the cellar and the transfer of the lubricant to the axle from such limited portions of the waste as may remain in contact with the axle.

Attempts at eliminating these objections to the use of waste by employing pumps, rollers and the like have also been unsatisfactory, because of the wear and deterioration of such movable parts. And attempts at using wicks to feed the lubricant proved disappointing because wicks easily glaze over and clog with dirt, so that oil will not feed through them; and also because in cold weather the wicks freeze to the axles when the locomotive is standing still, and the wicks are torn to pieces when the axles again revolve.

On driving journals, the lubrication has been effected with some success by forcing hard grease through a perforated plate curved to fit against the lower half of the axle; but in practice, the grease gradually clogs the perforations, particularly when dust has access to it. The perforated plates also easily become bent, thereby entailing an undesirably high maintenance expense. Moreover, the hard grease often sticks to both the perforated plate and the cellar, so as to hold this plate away from the axle, thereby resulting in a hot bearing. So also, the hard grease which sticks to the cellar requires considerable time and labor for digging it out, and the perforated plate has to be removed and cleaned with the use of hot water or steam, before the cellar can be repacked with grease.

My present invention aims to overcome all of the above recited objections to the previous methods of lubricating car axles, by providing a lubricator which includes no waste, wick or other lubricant-absorbing material; by feeding the lubricant from the lubricant container without employing any movable parts whatever; and by forming integral parts of the lubricant container so that they will automatically feed lubricant toward the axle, distribute the lubricant over the axle, return any excess of lubricant to the container, and substantially exclude both dust and moisture from the lubricator. In addition, my invention aims to construct the lubricator so that it can speedily be refilled with lubricant without detaching any part of the lubricator from the journal, and so as to employ atmospheric air pressure for feeding the lubricant to the axle.

To accomplish these purposes in the here illustrated manner, I provide a box-like lubricant container of a novel construction, as shown separately in Fig. 4, the lower portion of this container being vertically slidable in a shallow box-like container-support or cellar adapted to be supported by the bearing box; and I also provide a compression spring arrangement within this support for continuously pressing the lubricant container upwards into operative relation to the axle.

The container support or cellar 4 has its side walls 4A provided at their upper ends with outwardly directed flanges 4B sliding respectively in grooves formed in the inner faces of the U-shanks of the bearing member 2, so that this cellar can be slid into the lower portion of the bearing member from the outer end of the latter, after the lubricant container has been positioned in this cellar. Then I provide suitable means for preventing the cellar from sliding longitudinally of the grooves, such as a detachable latch pin 7 extending through alined bores in bosses 8 and 9 formed respectively on the outer end of one of the said shanks and on the cellar, this pin being retained in position by a key or cotter 10.

The lubricant container includes a box-like structure of rectangular horizontal section having the lower portions 11A of its sides and 11B of its ends bearing slidably respectively against the inner faces of the side and end walls of the cellar or container support 4, and this cellar desirably has a filler nipple 12 cast integral with the outer end of the container.

Connecting the ends of the lubricant container, desirably midway between the two side walls 11A, is a lubricant-distributing strip 13 which extends parallel to the axis of the bearing and which has its upper face curved to fit the curvature of the exterior of the axle 1, this strip being preferably made of a bearing metal.

This lubricant-distributing strip 13 is disposed at a considerable height above the bottom 11C of the container, and has depending from it one or more feed tubes 14 which desirably extend down to within a short distance from the top of the container bottom. The bore 14A of each such feed tube connects at its upper end with a lubricant passage extending upwardly through the strip 13, which passage desirably consists of an upright bore 15 of smaller diameter than the feed tube bore 14A and an upwardly flaring mouth portion 15A opening at the upper face of the said strip. Each such passage preferably has its upper or mouth end spaced by a considerable distance from both edges of the strip; and the width of the strip desirably is only a small fraction of the diameter of the axle.

Each end of the lubricant container has the major portion 11D of its upper edge curved concentric with the upper face of the lubricant-distributing strip 13 and hence also fitting against the axle 1, the upper side portions 11B of the container being of such length as to leave a free clearance space S between these ends and the lower side portions of the bearing 2 (as shown in Fig. 3).

Each upper side portion 11 of the lubricant container is also connected to the adjacent lateral edge of the lubricant-distributing strip 13 by a container top portion in the form of a web 16, which web is offset radially outward of the axle from the upper face of the said strip, so as to leave a considerable spacing between each of the said container top portions 16 and the axle. Each such web (or non-central container top portion) preferably slopes upwardly toward the adjacent side wall of the lubricant container, and desirably is curved concentric with the upper face of the medial top strip 13, so that the side portions of this container will effectively be considerably taller than the part of the container underlying the said strip. Each web 16 also is provided with a plurality of ports 17 for admitting either air or lubricant to the container through its top, these ports being preferably disposed (as in Fig. 5) to present their upper or inlet ends at a higher level than any portion of the medial top strip 13. The forward end wall 11B of the lubricant container also has a telltale port 18 leading to the upper portion of the interior of the container, this port being desirably at an elevation above that of the upper face of the said stop strip 13.

Attached to the inlet nipple 12 of the lubricant container is a valve body 19 housing a check valve 20 and a spring 21 continually pressing this valve outwardly against a seat, as shown for example in Fig. 6. This valve body is arranged in any usual manner (as by providing it with projecting pins 22) for interlocking with a pressure-type lubricant feeder, such as a socalled "Alemite" grease gun.

Thus constructed, my integral and box-like container forms a combined lubricant receptacle and lubricant distributor provided with a convenient filler inlet.

To press this container upwardly toward the axle, I desirably employ two spiral compression springs 23, each of which is centered at its lower end by a riser boss 24 on the bottom 4A of the cellar or supporting member of my lubricator. These springs are spaced longitudinally of the cellar and each secured at its upper end to a pressure-distributing plate 24 which bears upwardly against the bottom 11C of the lubricant container. Fastened to this plate is an eye 26 supporting a ring 27 which depends through a perforation 28 in the bottom of the cellar.

In substituting my lubricator for the usual waste-containing cellar at a wheel axle bearing, the previously employed cellar is removed from the bearing. Then the ring 27 is pulled downwardly to reduce the total height of the lubricator so as to freely clear the lower half of the axle while the lubricator is slid into the bearing. After latching the lubricator to the bearing, as by replacing the latch pin 7 and the cotter 10, lubricant is forced into the container through the valve body 20 until the lubricant begins to ooze out of the telltale opening 18, thereby filling the container to a level above that of the lubricant-distributing strip 13.

By thus introducing the lubricant under pressure, I also cause this to completely fill each of the upright lubricant ducts; and unless the axle already was sufficiently covered with lubricant by its previous greasing or other lubrication to seal the joint between the axle and the said strip 13, lubricant will also flow radially out of the upper end of each of the said ducts so as to seal the upper ends of these ducts against the entrance of air. In practice, an excess of lubricant may also flow beyond each side edge of the lubricant-distributing strip during the filling, so as to flow into the spaces between the axle and the lateral top webs 16.

During its initial rotation, the axle drags lubricant 32 with it from within the mouth end of each lubricant duct (and also initially from the space between the axle and the container-top web 16 toward which the axle rotates), and the lubricant adhering to the axle is further distributed over the axle by the pressure of the latter against the bearing 3. Consequently, while the initial charge of lubricant may only have distributed lubricant upon small and spaced areas of the top of the distributing strip or feed plate 13, one or two rotations of the axle will suffice to spread lubricant over the entire top of this strip, thereby effectively sealing the upper ends of the lubricant ducts to the axle.

During the continued rotation of the axle, my lubricator automatically continues to feed lubricant upwards through the lubricant ducts against the bottom of the axle and keeps these ducts full of lubricant until the level of lubricant in the container drops below the lower end of the feed ducts, thereby continually lubricating the axle. As at present understood, this continuous feeding of the lubricant is due partly to the cooperating action of the following structural provisions:

(1) Fitting the upper face of the feed plate 13 of the lubricant container to the axle, so that the upward pressure of the springs will leave only a spacing of capillary width (filled with a film of lubricant) between the feed plate and the axle, thereby causing capillary action to accelerate the dragging of lubricant over the side half 13A (Fig. 5) toward which the lower portion of the axle is rotating.

(2) Providing each feed duct with an upwardly flaring mouth portion 15A to spread out the lubricant and to provide a slope up which lubricant is dragged and pushed by the axle and probably also sucked to some extent by the said capillary action in the minute space between the feed plate 13 and the axle.

(3) Making the part 15 of each feed duct immediately below the tapering mouth portion of the duct of a bore diameter which is also of a capillary size and preferably not more than about one-quarter the diameter of the extreme upper end of the duct.

(4) Making the lower portion of each feed duct of a bore diameter not materially greater than the extreme upper end of the duct.

With the parts thus proportioned, their co-operating action may be explained as follows: With the axle rotating in a counter-clockwise direction in Fig. 5, the scraping of residual lubricant off the axle by the left-hand edge 13C of the lubricant distributing plate will still leave a film of lubricant on the axle, to which additional lubricant within the mouth portion 15A of the lubricant duct will cling, so that the part of the axle passing over this duct mouth will tend to drag with it a much greater thickness of lubricant than the said film.

Owing to the upward sloping of the duct mouth (at the side of the duct toward which the adjacent part of the axle moves) this adhering lubricant tends to slide up the incline and the adhering lubricant behind it pushes the lubricant up this slope. Consequently, the lubricant which rides up this slope is pushed forcibly between the right-hand part 13A of the lubricant distributing feed plate and the axle. And this forcing of the lubricant over the said part 13A is accelerated, particularly if the axle is rotating rapidly, by the capillary action between that part and the axle, it being well known to physicists that such a capillary action occurs between properly fitted and relatively moving parts.

Since the scraper edge 13C of the lubricant distributing plate limits the amount of lubricant which passes over the left-hand portion 13B, the lubricant forced out of the mouth portion of the duct must be taken out of this mouth, thereby tending to produce a partial vacuum below it; consequently, the atmospheric air pressure on the top of the lubricant forces the needed additional lubricant up the duct. If the duct had an entirely cylindrical bore, as has heretofore been proposed, this lifting of lubricant in the duct would not be sufficiently fast—particularly when the axle is rotating rapidly—to compensate for the lubricant taken out of the upper end of the duct. However, by making the duct portion 15 which is directly below the flaring mouth end of a considerably smaller diameter than the extreme upper end of the duct, (as for example of a diameter not over a quarter of an inch) I also secure a capillary action for feeding lubricant upwardly as fast as there is room for more of it in the mouth portion of the duct. By making the lower portion 14A of the bore of each duct of larger diameter than the part 15, I not only expedite the cleaning of the latter part but also obtain a socalled tuyère action to increase the rate at which lubricant passes through the bore part 15. To facilitate the casting of the member which includes both the presser plate and the depending tubes, the lower bore portion 14A may taper upwardly as shown in the drawings, but preferably has a maximum diameter not materially greater than the mouth end of the duct, as an undue increase in the size of the lower end has been found to interfere with the continuous action of my lubricator at some rates of rotation of the axle.

If the bores of the feed duct were simple cylinders, as heretofore proposed, the upper edge of the bore would scrape off the additional lubricant adhering to the axle portion which is passing over the mouth of the duct, so that the lubricant-feeding operation would discontinue as soon as the level of the lubricant in the container is below the mouth end of the duct. However, with the upwardly flaring mouth end and with the part below it proportionally contracted in diameter, my lubricator has been found to operate continuously at all axle speeds common in railroad practice, and also will readily start a feeding of the lubricant (after the vehicle has been halted) even when the level of lubricant in the container is only slightly higher than the lower ends of the feed ducts.

During the continued rotation of the axle, lubricant dripping from the edge of the upper axle half which is rotating toward the container— which would be the left-hand one in Fig. 1 when the axle is rotating in a counter-clockwise direction—will flow down upon the adjacent cover web 16 toward the left-hand edge of the upwardly projecting lubricant-distributing strip 13. But the pressure of this strip against the axle, even when much weaker than the pressure of the axle against the bearing, will deter this portion of the lubricant from being drawn freely over the said strip and particularly will prevent any dust or other foreign matter from being drawn over this strip. Consequently, part of the lubricant drawn along this strip beyond the mouth of each lubricant duct will be sucked out of that duct, and since a corresponding drop in the level of the lubricant 32 in the container would tend to produce a partial vacuum, the atmospheric pressure of the air admitted through the ports 17 in the top of the container will force additional lubricant up each duct.

As the result, each lubricant duct remains completely filled when this level falls—as shown in Fig. 5—and until that level drops at least as low as the bottom of all of these ducts. Indeed, owing to the viscosity of lubricants, this level may even fall somewhat below the lower ends of the lubricant ducts, so that I can readily secure an almost complete emptying of the container when these ducts are spaced from the container bottom by a distance of say an eighth of an inch. Such an adequate feeding of the lubricant solely by the action of atmospheric pressure has been accomplished with my lubricator in the use of widely varying lubricants, including numerous grades of oil and also including grease of the consistency of vaseline at 30 degrees Fahrenheit.

Since no space is occupied within the container by any waste, wicks or the like, this means that my lubricator can easily have a high effective capacity in proportion to the interior content of the container. Moreover, since the arcuate end webs 11D on the container bear against the axle to prevent the entrance of both dust and moisture at both ends of the bearing, and since my lubricator does not need to be opened for recharging it, I almost entirely eliminate the contamination of the lubricant by dust, soot or moisture in comparison with the customary waste-filled cellars which must be opened for recharging them.

If more lubricant is dragged beyond the distributing strip 13 than will adhere to the axle, the excess will return to the interior of the container through the ports 17 toward which the axle moves, as shown in Fig. 5, as the ports at that side of the said strip serve both as air vents and as overflow ports. At the other side of this strip, the ports 17 serve as air vents; and these ports also will permit some spent lubricant to return to the container but only to such a trivial extent as to require long continued operation before the container needs to be cleaned out.

Such long intervals of time between the need of cleaning the container have been particularly attained when the ports 17 and 18 (two sets of which are required so as to make my lubricator function equally well when the axle is rotating in either direction) are smaller in diameter than the minimum diameter of each feed duct, so as to exclude from the container any particles which might clog the feed ducts.

In practice, the diameter of each lubricant duct may be considerably varied, as also its longitudinal section, but with the grades of oil or grease suitable for use in connection with railway car axles I have found it advisable to provide each bore both with an upwardly flaring mouth portion to facilitate a distribution of the lubricant over the axle and to enhance the sucking of the lubricant, and with a larger-diametered lower portion affording a shoulder at its juncture with the intermediate bore part, which shoulder tends to exclude non-liquid particles from the latter bore part.

For example, I have found in railway practice that while a simple cylindrical bore of $\frac{3}{16}$ inch diameter will operate, a bore of this same diameter when widely flared out at its upper end to a mouth diameter of about three-eighths of inch in diameter will lubricate more rapidly. But with each of these arrangements clogging has been found to occur too easily, hence I preferably employ both the upper flaring duct end upon a medial duct portion 15, together with a larger diametered lower duct portion 14 as shown in Fig. 5, and for car axle lubricants I desirably use the medial duct portion not over about $\frac{3}{32}$ inch in diameter. And by making the medial portion 15 relatively short in proportion to the total length of the duct, I make it easier to clean the ducts.

For adequate wear, the medial container top strip 13 is preferably made of a bearing metal, and desirably of the same metal as the two cover parts 16 between which this strip is disposed. To facilitate the manufacture of the container, I have found it expedient to cast both the riser walls as well and the major portions of the cover webs 16 integral with each other initially, leaving a gap between these web portions, the edges of which gap are shown in dotted lines at 30 in Fig. 5. This facilitates the coring and permits all sand and grit to be removed from the interior of the container before the said gap edges are machined to an exact spacing, and also permits the upper surfaces of the webs 16 to be turned to smooth surfaces. Then the part of the container cover between the lines 30 in Fig. 5, including the integral feed tubes 14, can be separately cast and machined and welded to fit across the said gap, after which the upper face of the strip portion 13 is machined.

By extending this strip toward the axle beyond the upper surfaces of the cover webs 16 I allow for a considerable wear on the pressure-distributing strip 13 before the container needs to be replaced, and with the relatively light spring pressure required for securing an effective air seal between this strip and the axle, this wear is at a quite slow rate.

Since the approximate mileage served by the lubricant-filled container can easily be determined experimentally, my lubricator will readily give adequate service when recharged (up to the indication afforded by the telltale opening 18) at somewhat smaller mileage intervals, without requiring the opening, disassembling, removal or inspection of any part. And owing to effective exclusion of dust and soot as well as moisture, my lubricator affords a more complete and efficient use of the lubricant than the railway car axle lubricators now commonly employed.

Moreover, my invention saves a large proportion of the now commonly required attention to locomotive or car axle lubricators, since each recharging consumes very little time, and since such recharging is only needed at long intervals; and also because so little time is required for removing and cleaning out the entire lubricator when this becomes necessary, which probably will be only about once in twelve months.

My lubricator construction also affords this additional important advantage: When a locomotive or railway car passes over a switch or frog, the bouncing frequently tilts the car body sufficiently to drop the axle momentarily away from the bearing, and the resulting slamming may cause damage to the customary lubricators. With my lubricator, the springs resist such a separational movement and continuously hold the lubricating strip in engagement with the axle, thereby eliminating such damage.

However, while I have heretofore described my lubricator as applied to the socalled driving box of a locomotive, I do not wish to be limited as to its uses, since its operation would obviously be the same when modified for use on railway cars or other vehicles, and since it also would function similarly in connection with axles or shafts employed for other purposes.

So also, I do not wish to be limited to the details of the construction and arrangement disclosed in connection with the illustrated embodiment, since many changes might be made without departing either from the spirit of my invention or from the appended claims. Nor do I wish to be limited to the joint use of the numerous novel features of my invention with one another.

For example, it will be obvious without the use of additional drawings that the cover member of my lubricant container need not be integral with the body of the container, although I preferably make it so. Likewise, it will be evident that the lubricant-distributing strip and the ducts depending from it would function in the recited manner even if the lateral top portions 16 and 17 were entirely omitted, but I preferably include these latter portions both for aiding in the initial lubricating of the axle and for more effectively excluding dirt and other foreign particles from the interior of the lubricant container.

So also, the number of lubricant ducts and of ports in the top of the container can be varied, but I preferably provide a plurality of such ducts and also of the ports at each side of the ducts, so as to reduce the effect of possible clogging actions to a minimum.

I claim as my invention:

1. A lubricator for an axle or the like, comprising a lubricant receptacle disposed below the axle, a lubricant distributing member overhanging the receptacle disposed between the axle and the interior of the receptacle, and yielding means operative for continuously pressing the said member against the axle; the said member having its upper face curved to fit directly against the axle and having a lubricant passage extending upwardly from within the receptacle to the upper face of the said member; the lubricant passage having an upwardly flaring mouth portion opening at the said upper face.

2. An axle lubricator as per claim 1, in which the upper end of the mouth portion of the lubricant passage has a diameter not less than twice nor more than four times that of the feed bore portion of said lubricant passage at the lower end of the flaring mouth.

3. An axle lubricator as per claim 1, in which the lubricant passage includes a portion of cylindrical bore leading upwardly directly to the said mouth portion and corresponding in diameter to the lower end of the mouth portion, and a lower portion of a diameter not materially less than twice nor more than four times that of the said cylindrical bore portion.

4. A lubricator for an axle or the like, comprising a lubricant receptacle disposed below the axle, a lubricant feeding and distributing member disposed between the axle and the receptacle, and yielding means operative for continuously pressing the said member against the axle; the said member having its upper face curved to fit directly against the axle and having at least one upright lubricant passage extending from points above and near the bottom of the receptacle to the said upper face, each such lubricant passage including an upwardly flaring mouth portion opening at the said upper face, a cylindrical feed bore portion leading upwardly to the said mouth portion, and a lower bore portion of a diameter not materially greater than the upper end of the said mouth portion.

5. Means for lubricating a bearing overhanging an axle comprising a box-like lubricant container underhanging the axle and substantially of the same length as the bearing, the top of the container having its upper face curved to fit against the axle both at each end thereof and along a medial strip extending longitudinally of the axle below the axle, and the remaining portions of the said upper face being curved to space them freely from the axle, the container being of such a height as to present the upper ends of the said remaining top portions at a relatively short spacing from the bearing, and the container top having drip ports leading from each of the said remaining top face portions; feed tubes depending from the medial portion of the said top and extending downwardly into the container and presenting flaring mouth ends to the axle through the said medial upper face portion of the container top, and spring means continuously pressing the container against the axle.

6. Axle lubricating means as per claim 5, in which the container is provided at one end thereof both with a lubricant inlet and with a telltale port, the telltale port being disposed at an elevation approximating that of the upper face of the said medial strip.

EMIL E. VON BERGEN.